US007888633B2

(12) United States Patent
Franzen et al.

(10) Patent No.: US 7,888,633 B2
(45) Date of Patent: Feb. 15, 2011

(54) EVALUATION OF SPECTRA IN OSCILLATION MASS SPECTROMETERS

(75) Inventors: Jochen Franzen, Bremen (DE); Karsten Michelmann, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 194 days.

(21) Appl. No.: 12/037,506

(22) Filed: Feb. 26, 2008

(65) Prior Publication Data

US 2009/0084949 A1 Apr. 2, 2009

(30) Foreign Application Priority Data

Feb. 26, 2007 (DE) ...................... 10 2007 009 272

(51) Int. Cl.
*B01D 59/44* (2006.01)

(52) U.S. Cl. ...................... 250/282; 250/281; 250/290; 250/291; 250/292; 250/293; 702/23; 702/31; 702/75; 702/76; 702/106

(58) Field of Classification Search ................ 250/281, 250/282, 290, 291, 292, 293, 295; 702/22, 702/23, 31, 32, 75, 76, 85, 106
See application file for complete search history.

(56) References Cited

U.S. PATENT DOCUMENTS 5,283,436 A 2/1994 Wang ........................ 250/292
5,625,186 A 4/1997 Frankevich et al. ............ 49/42
5,886,346 A 3/1999 Makarov .................... 250/291
6,590,204 B2 * 7/2003 Baranov ..................... 250/282
7,638,764 B2 * 12/2009 Ivosev ........................ 250/282
2005/0077466 A1 * 4/2005 Adrien Baillargeon ...... 250/291
2006/0250288 A1 * 11/2006 Fernandez et al. .......... 341/120
2009/0194688 A1 * 8/2009 Bateman et al. ............. 250/292

FOREIGN PATENT DOCUMENTS

WO WO 2006/045393 5/2006
WO WO 2006/058198 6/2006

* cited by examiner

*Primary Examiner*—Bernard E Souw
*Assistant Examiner*—Michael J Logie
(74) *Attorney, Agent, or Firm*—O'Shea Getz P.C.

(57) ABSTRACT

The invention relates to mass spectrometers in which ion clouds are stored in two spatial directions by radial forces while oscillating largely harmonically at a mass-specific frequency in a third spatial direction perpendicular to the other two, in a potential minimum, the shape of which is as close to a parabola as possible. Analysis of the oscillation frequencies of these ion clouds, preferably by a Fourier analysis, leads via a frequency spectrum to a mass spectrum. The frequency spectrum is analyzed to identify false signals in the frequency spectrum as harmonics and eliminating them where necessary.

11 Claims, 3 Drawing Sheets

EVALUATION OF SPECTRA IN OSCILLATION MASS SPECTROMETERS

PRIORITY INFORMATION

This patent application claims priority from German patent application 10 2007 009 272.7 filed Feb. 26, 2007, which is hereby incorporated by reference.

FIELD OF THE INVENTION

The invention relates to mass spectrometers in which clouds of ions of the same mass perform harmonic oscillations, and the analysis of the oscillation frequencies allows a mass spectrum to be determined.

BACKGROUND OF THE INVENTION

Fourier transform mass spectrometry (FT-MS) is generally understood to mean ion cyclotron resonance mass spectrometry (ICR-MS) because it records the mass-specific cyclotron motions of the ions as image currents in detection electrodes, and uses a Fourier transformation to convert the detected currents into a spectrum of the cyclotron frequencies. The spectrum of cyclotron frequencies is then converted into a mass spectrum by a mathematical transformation. Calibration constants are incorporated into the transformation function to take into account distortions to the frequency spectra caused, for example, by superimposed magnetron motions.

It has since emerged, however, that there are a range of mass spectrometric principles that allow mass-specific oscillations of ions to be used to compile mass spectra. These principles are distinguished by the fact that ions can be stored in specific cloud formations in two spatial directions by radial forces in a plane and that the ion clouds oscillate freely in a direction perpendicular to these two spatial directions in a potential which is as harmonic as possible. The radial forces that store the ion clouds can be magnetic fields, RF-generated pseudopotentials or radial electrostatic fields between central electrodes and outer shell electrodes.

In contrast to ICR mass spectrometers, these mass spectrometers do not detect an orbiting cyclotron motion of the ion clouds, but a backward and forward oscillating motion in the harmonic potential. If the radial forces are the same in all cross-sections along the direction of oscillation, ions of different masses oscillate as coherent ion clouds with different forms and different frequencies. The oscillations of the ion clouds can be measured in the form of induced image currents by suitably mounted detection electrodes. A Fourier analysis of these image currents produces the spectrum of the oscillation frequencies which occur in the mixture of oscillating ion clouds.

As is known, a harmonic potential is characterized by the fact that it creates a field which drives the ions deflected from the center back to the center again with a force proportional to the separation. This condition is fulfilled when the potential has a minimum in a center and increases as a parabola outside the center in the direction of the oscillation.

This new class of mass spectrometers includes the three-dimensional RF quadrupole ion traps operated with image current detectors, which are described in U.S. Pat. No. 5,625,186.

Another known embodiment uses a stack of plates to generate a three-dimensional quadrupole field in which ions can oscillate, see for example U.S. Pat. No. 5,283,436.

This class of mass spectrometer also includes the mass spectrometers manufactured by ThermoFisher and known by the trade name Orbitrap™ spectrometers, in which ions orbit in an electric radial field, on the one hand, and oscillate in an electric potential well in a direction perpendicular to this, on the other hand. The superimposed potentials are generated by two electrodes, an interior spindle and an exterior barrel.

It is possible to design more mass spectrometers in this new class, however. The ions can, for example, be made to oscillate between two pole rods in linear RF quadrupole ion traps (FIG. 3), in which case image current detector electrodes can be inserted between the pole rods.

The three-dimensional ion trap shown for example in FIG. 1 can also be operated with DC potentials and confined in a very strong magnetic field, producing a parabolic potential between the end caps in which ions can oscillate. These oscillations are known as “trapping oscillations”. The electrostatic field in the interior forms a saddle and the magnetic field must be very strong to keep the ions on the ridge of the saddle. For this, the image current detectors do not have to be very small; the whole of the end caps can be used as image current detectors.

A similar saddle-shaped electrostatic potential profile can also be generated with the aid of ring diaphragms, as shown for example in FIG. 4, if suitably calculated potentials are applied across the individual rings. Here, as well, it is possible to generate harmonic oscillations of the ions in a strong magnetic field. The potential here can be set so that there is a zero potential across two ring diaphragms, and these electrodes can be used as image current detectors.

All these oscillations in the direction transverse to the plane of the radial storage field can be tracked in suitable image current detectors and examined by Fourier analyses to establish the ion oscillation frequencies they contain. The Fourier analysis is essentially carried out as a fast Fourier transformation (“FFT”) of the image currents from the time domain into the frequency domain.

The mass spectrometers of this new class, diverse as they are, will be collectively termed “oscillation mass spectrometers” here because they all analyze harmonic oscillations of the ions in a harmonic potential. There is, as yet, only one embodiment of these oscillation mass spectrometers on the market, namely the Orbitrap™ mass spectrometer sold by ThermoFisher.

These oscillation mass spectrometers usually require a good vacuum so that, during the measuring period, the harmonically oscillating ion clouds do not diverge diffusely as the result of a large number of collisions. Furthermore, they require good ion injection conditions so that the ions can be collected in a suitably shaped ion cloud. The characteristic feature of this new class of oscillation mass spectrometer is a high mass resolution in the order of $R=m/\Delta m=100{,}000$, where m is the mass and $\Delta m$ the full width at half-maximum of the mass signal. They are therefore better suited for the analysis of larger organic molecules. These larger organic molecules are generally ionized by electrospray ionization. The electrospray ionization generates the ions by protonating the molecules of the substance being analyzed; as a rule, not only singly charged ions are generated, but also large numbers of multiply charged ions are generated by multiple protonation.

In mass spectrometry, it is not the mass of the analyzed ions which is determined, but the mass-to-charge ratio m/z, where m is the physical mass and z the number of elementary charges on the ions.

SUMMARY OF THE INVENTION

A harmonic oscillation requires a good parabolic potential profile. Usually a goal of those who develop this type of mass spectrometer with harmonic potential is to generate this potential profile without any failures whatsoever. However, there are varied reasons why this is not always possible. Deviations in the potential profile occur as a result of the mechanical precision which is required and, in the case of multi-electrode systems, the electrical precision as well. Multi-electrode systems also frequently lead to a stepped shape of the potentials. These deviations from the ideal potential profile lead to false signals appearing in the frequency spectrum and in the associated mass spectrum.

An analysis of the problems which occur leads to the conclusion that, as with a warped bell, the distortions of the basically harmonic potential result in higher harmonics, which are superimposed on the fundamental oscillations. It thus follows that at least part of the false signals originate from harmonics of the fundamental oscillations of the ions in the slightly distorted harmonic potential. If the distortion of the potential profile is symmetric, additional higher frequencies occur which are odd multiples of the frequency of the fundamental oscillation. Frequencies thus occur which are three times, five times and seven times the fundamental frequency. When the distortion is asymmetric, the even multiples of the fundamental frequency also occur, i.e., frequencies with twice, four times and six times the frequency of the fundamental oscillation. The harmonics are also termed “higher harmonic oscillations”, the “first harmonic” (double frequency) being termed the “second harmonic oscillation”.

When the image currents are Fourier analyzed, the harmonics provide frequency signals which should be assigned to real ions. However, these are false signals. Appropriate transformation equations for converting the oscillation frequencies of the ions into masses are known. An uncritical conversion of the frequency spectrum into a mass spectrum gives a mass spectrum which does not correspond to the reality of the composition of the ions, but which contains additional false ion signals.

The invention includes analyzing the frequency spectrum of the ions to establish if harmonic signals occur, and identifying these harmonic signals so they can then be removed/attenuated from the spectrum. Each frequency signal is therefore examined to establish whether it has harmonics or whether it is itself a harmonic to a frequency signal present as a fundamental oscillation. The signals of the other ions of the same isotope group can be used to definitely identify the signals as harmonics. These isotope signals must possess the same signal height ratios as the isotope signals of the ions in fundamental oscillation. An instrument-specific spectrum of the harmonics (the “timbre” of this mass spectrometer, so to speak) can also be scanned and the knowledge of the signal height ratios of the harmonics with respect to each other can be used to provide further certainty for the identification. This method of certain identification of the harmonics may be done in an automated manner using a processor.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 1 illustrates a three-dimensional ion trap with end caps 12, 13 that enclose two image current detectors 14, 15 in their center. An RF voltage across the ring electrode 11 stores the ions. The ion clouds, which are stored in the form of elliptical disks, can be forced to oscillate by different types of excitation pulse across the end cap electrodes 12, 13. The ion clouds 17, 18 and 19 with ions of different mass then oscillate to and fro in direction 16 between the end caps 12 and 13 and their oscillations can be recorded by the image current detectors 14 and 15.

FIG. 2 also represents a three-dimensional ion trap that includes individual diaphragms 1-5 in the form of a stack. In the interior of the diaphragm stack, which is shown cut away, an empty double cone has been cut out of the diaphragms; a quadrupole field can be generated in this double cone by applying the two RF frequency phases A cos(ωt) and −A cos(ωt) across the diaphragms, the quadrupole field being practically identical to the quadrupole field of the ion trap shown in FIG. 1. The ion clouds 8 can oscillate here between the plates 1 and 5 in direction 9. The diaphragms 2 and 4 are at zero potential and can be used as image current detectors. The image currents can be amplified, digitized and processed further in the electronic unit 7.

FIG. 3 illustrates a linear quadrupole ion trap with four image current detectors 54 to 57 arranged between its pole rods 50 to 53. The ion cloud 59 oscillates between the pole rods 51 and 53 and the image current detectors 54, 55 and 56, 57, which are connected in pairs, detect the oscillations. The image currents are amplified, digitized and analyzed for frequency signals in the electronic device 58.

FIG. 4 is a schematic representation of a magnetic storage of the ions by a solenoid 20 and the generation of a harmonic (saddle-shaped) potential by a relatively large number of ring electrodes 23. The electrostatic potentials can be selected so that two ring electrodes 23 and 24 are at zero potential and can be used as image current detectors.

FIG. 5 illustrates an arrangement in which all potentials are generated electrostatically. The ions orbit on circular paths and are thus captured radially. The annular orbital clouds 42 then oscillate to and from in the longitudinal axial direction 43. An external electrode 41, divided in the middle, can be used as the image current detector.

DETAILED DESCRIPTION

Figure 1:
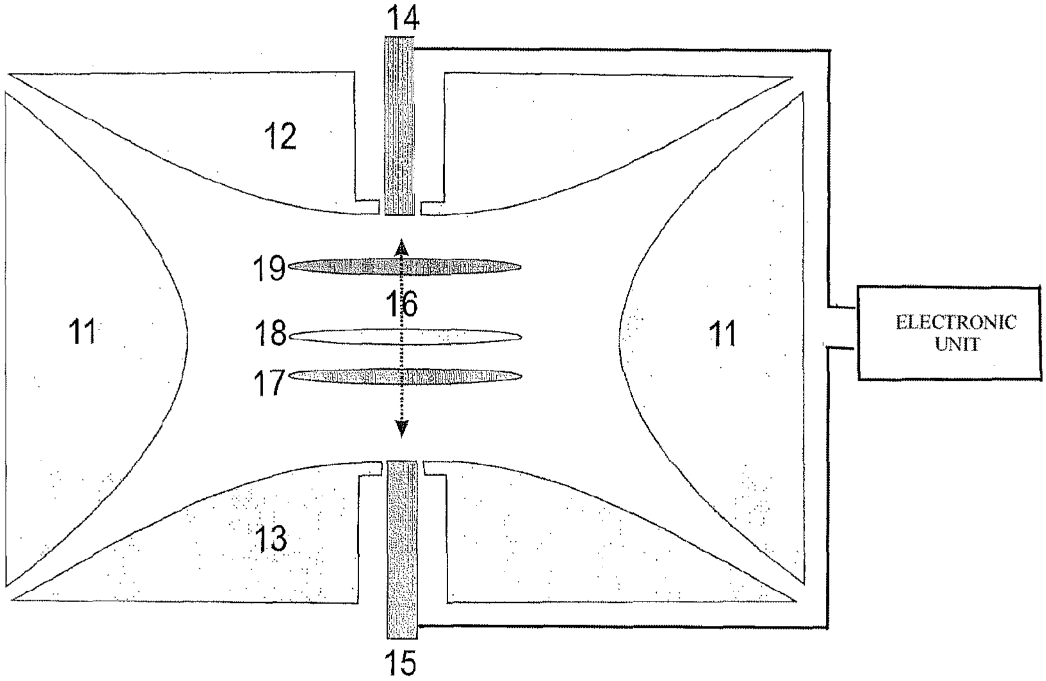
FIGS. 1 to 5 are schematic representations of various embodiments of oscillation mass spectrometers with a harmonic potential in one spatial direction and which differ in the way they store ions by radial forces in the two other spatial directions. The arrangements in FIGS. 1, 2 and 3 use pseudopotentials as harmonic potentials for the mass-specific oscillations whereas, in FIGS. 4 and 5, electrostatic potential profiles are available for the oscillations.

Until now, the occurrence of harmonics with oscillating ions has only been observed indirectly. In three-dimensional RF quadrupole ion traps, ion losses due to so-called non-linear resonances occur under certain conditions. These can be explained as the excitation of the harmonics of the ions oscillating in the ion trap between the end cap electrodes by Mathieu sidebands. The Mathieu sidebands arise as a result of the oscillations of the RF voltage that are imposed additionally on the ions oscillating in the ion trap. Special ion trap designs have made it possible to use the non-linear resonances for a particularly effective mass-selective ion ejection.

These harmonics must occur with all ion oscillation processes, if the potential profile in which they oscillate is not perfectly parabolic. Harmonics occur when the harmonic oscillational system is slightly distorted. A slightly warped bell sounds "shrill" whereas a bell that is not warped has a "pure" sound. "Pure" and "shrill" are synonyms here for the timbre which have few harmonics and those which have a large number of harmonics. Every musical instrument has its own harmonic spectrum, which musicians call "timbre". String and wind instruments (chordophones and aerophones), in particular, have (apart from weak noise background) harmonics with frequencies that are precisely whole integral multiples of the fundamental frequency. (Other types of harmonics may occur in cases with two-dimensional membranes.)

If the oscillations of the ions in one spatial direction are decoupled from the motions in the other two spatial directions and if they oscillate in one direction in an at least approximately parabolic potential well, their oscillation in this direction is harmonic; slight distortion of the harmonic potential profile produces harmonic oscillations. These harmonics may be very small, their signal height in the Fourier transformation of the image currents may be only one percent of the signal height of the fundamental oscillation or less but, nevertheless, they are a disturbance because mass spectrometry tries to record the quantities of the ions involved over at least three powers of ten, preferably over four or five powers of ten.

The relationships between the oscillation frequencies and the associated ion masses are known in principle: they depend on the type of potential in which the ions oscillate.

If the oscillations take place in RF-generated pseudopotentials, the masses are approximately reciprocal to the oscillation frequencies. There is no closed analytical conversion formula here, but approximation equations are known which allow a conversion, which can be as accurate as desired. With an uncritical conversion, the harmonics provide false ion masses which are close to the mass-to-charge ratio m/z of the multiply charged ions. The signals of the isotope groups of false signals and real signals can be largely superimposed on each other, making identification of the false signals in the mass spectrum itself more difficult.

If the oscillations take place in a real electrostatic potential, the ion masses are the precise reciprocal of the square of the oscillation frequency. In this case, if the conversion is uncritical, the signals of the first harmonic, i.e., the second harmonic oscillation, appear to cause fictitious mass signals of quadruply charged ions, but without the masses of the additional three protons which are present in ions quadruply charged by protons. When using these mass spectrometers with a harmonic potential, the molecules being analyzed are generally ionized by electrospray ionization, which means that multiply charged ions always occur as well as singly charged ions; and so the harmonics can easily be overlooked. Electrospray ionization generates quadruply charged ions $(m+4)^{4+}$ by quadruple protonation, for example, where m is the mass of the molecule. The mass-to-charge ratios m/z of these ions are thus (m+4)/4. The first harmonic of the singly charged ions, on the other hand, provides false ion signals at the mass (m+1)/4, which is very close to the masses of the multiply charged ions. Furthermore, since the ions of organic molecules form an isotope group with three, four or five signals and the ion signals are each separated by one mass unit, only careful analyses can ascertain whether harmonics occur.

Figure 4:
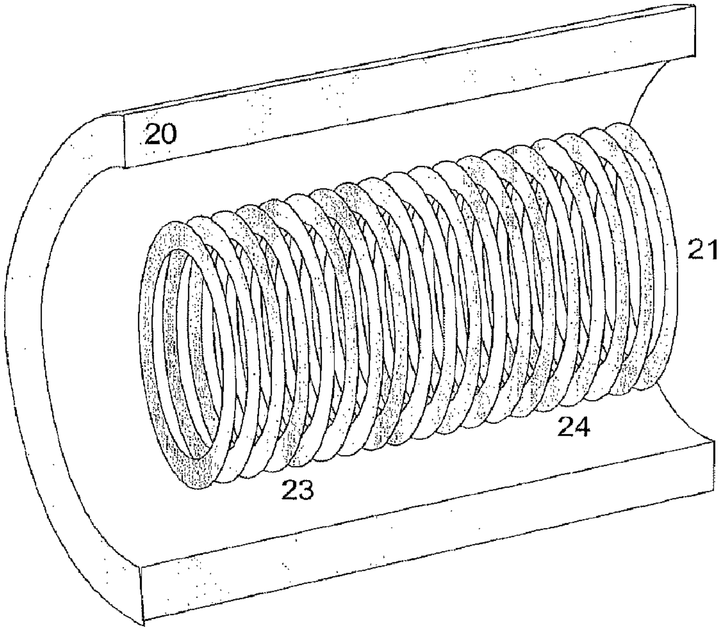

Developers of mass spectrometers strive to build instruments which are as precise and error-free as possible. This is correct in principle and can also be largely achieved for some of the oscillation mass spectrometers dealt with here. Yet if the potential profiles cannot be ideally shaped by mechanical precision alone, as is achieved in the Orbitrap™ mass spectrometer, harmonics have to be tolerated. If the potential profiles are formed, for example, by ring systems, as in FIG. 4, or by plate systems, as in FIG. 2, deviations from the ideal parabolic potential profile are unavoidable. In such cases, the techniques of the present invention help to keep the signals of the harmonics out of the mass spectrum.

This invention therefore makes it possible to also build oscillation mass spectrometers which, in principle, do not allow a perfectly harmonic potential profile to be generated. This is of interest because, on the one hand, this type of mass spectrometer provides a high mass resolution and, on the other, suffers relatively little interference from space charges. It therefore facilitates the storage of high numbers of ions without the space charges disturbing the mass spectrum by reducing the mass resolution.

An aspect of the present invention includes identifying false signals as harmonics and eliminating them from the spectrum. This may preferably be performed by analyzing the frequency spectra, because the mass spectra obtained from the frequency spectra by conversion are not so favorable for this purpose. It involves examining frequency components to establish whether it is itself based on a harmonic or whether there are harmonics to this signal. The frequency ratios between fundamental oscillations and harmonics are known and form the basis of the search.

Figure 6:
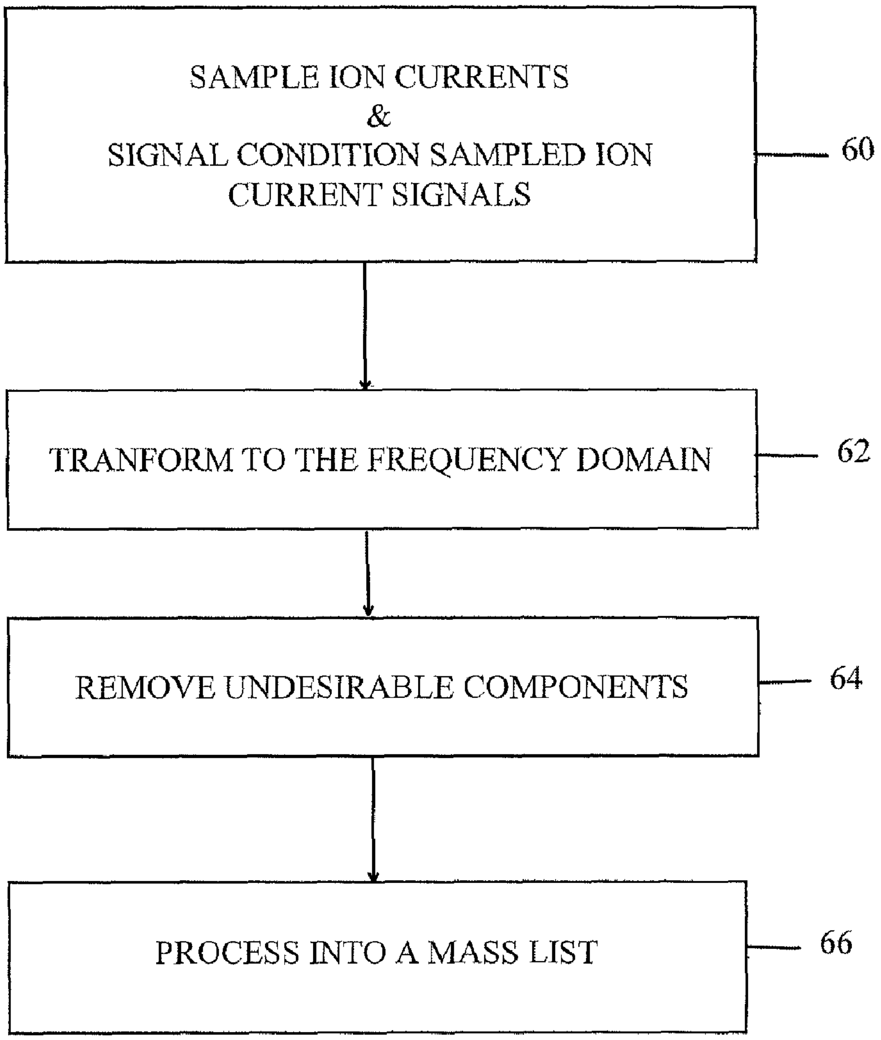
FIG. 6 is a flow chart illustration of processing according to an aspect of the invention.

FIG. 6 is a flow chart illustration of processing according to an aspect of the invention. In step 60, ion current signals are sampled using the image current detectors, and then processed and stored. The sampled signals are then transformed in step 62 from the time domain to the frequency domain (e.g., with an FFT). In step 64 the frequency spectrum is then analyzed. For example, the frequency spectrum may be processed by a peak-picking routine that searches for peaks and forms a "frequency list" of peak signals with intensities and frequencies. The frequency list is then processed to determine harmonic frequencies on the list, and the frequencies determined to be harmonics are removed from the list to provide a corrected frequency list. In step 66 the corrected frequency list is then transformed, for example by a "calibration curve" describing m=f(omega), into a mass list, which represents the "mass spectrum". Advantageously, harmonics on the frequency list are removed prior to conversion to the mass list. One of ordinary skill will immediately recognize that there are a number of different techniques that may be used to enjoy the advantages of the inventive technique.

By prior scanning of an instrument-specific frequency spectrum for the individual oscillation mass spectrometer, the ratios of the signal heights between fundamental oscillations and the various harmonics are known; they make it easier to locate the harmonics and can be used to confirm the correct identification of a harmonic.

The search for harmonics is also made easier because one observes the whole isotope group, the signal height ratios of which must be the same for both fundamental oscillations and harmonics. The search is made more difficult, however, by the superposition between the false signals of the harmonics of isotope groups and the real signals of the ions that are multiply charged by several protons.

Depending on the type of oscillation mass spectrometer, it is possible that the signal height of the harmonics is very small in relation to the signal heights of the fundamental oscillations. But even with ratios of less than one percent, for example, harmonics still occur for strong ion signals, which would adversely affect the mass spectrum if they were not eliminated. The false signals of the harmonics can be removed simply by removing the relevant signals. In the case of superimposed signals, this also corrects the signal height: the signals have a better correspondence to the true ratios of the signal heights.

The mass resolutions in oscillation mass spectrometers are a function of the measuring time. With long measuring times of a second or more, the mass resolutions can be very high; values of R equal to 100,000 can be achieved. Since the proton mass is 7.3 milli-mass units heavier than the unified atomic mass unit u, it is just about possible, for lighter ions with masses up to some 500 u, to distinguish the signals of the ions which have been doubly charged by two protons from the false signals of the harmonics of these ions.

If the oscillation spectrum is converted to a logarithmic scale of the frequencies, the harmonics have the same separations from the fundamental oscillations. This can be utilized for a simple correlational analysis of the logarithmic oscillation spectrum with the logarithmic instrument-specific "timbre" of the mass spectrometer.

If one considers the spectrum of the harmonics of an ionic species for a specific oscillation mass spectrometer as an "instrument function", this instrument function can be removed from the oscillation spectrum using known methods of calculation which again are based on Fourier transformations. This removes all harmonics from the oscillation spectrum.

Many types of oscillation mass spectrometer are conceivable, but only a few of them have been realized as yet. The oldest type of oscillation mass spectrometer is the Fourier transform ion trap, which is described in the above-cited U.S. Pat. No. 5,625,186, and was examined roughly ten years ago in the working group headed by Prof. Graham Cooks. The arrangement is generally shown in FIG. 1. It has never been used commercially because it has great difficulty in detecting the minute image currents in the presence of high RF voltages. The RF voltage of the ring electrode induces considerable RF voltages in the image current detector electrodes, and these must be cleanly filtered out. The quality of the mass spectra obtained is not good enough to find false signals therein by use of harmonics.

Figure 5:
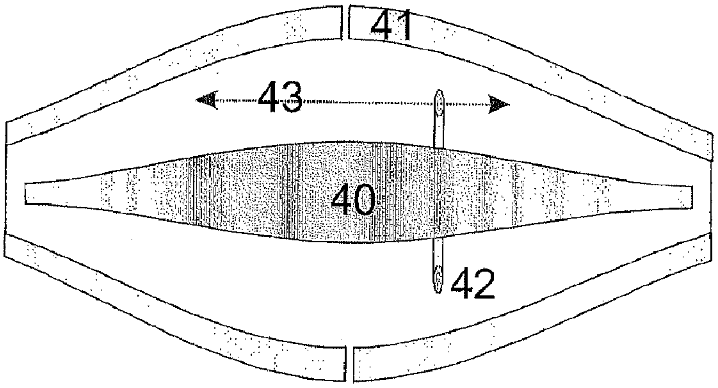

The only commercially available oscillation mass spectrometer to date is the Orbitrap™ mass spectrometer from Thermo-Fisher, whose principle is illustrated in FIG. 5. This spectrometer can be manufactured to such a high degree of precision that no measurable harmonics occur. Furthermore, this principle has the advantage of not using RF voltages, which may interfere with the detection of the image currents. The technique of the present invention may allow in the required manufacturing precision.

Figure 2:
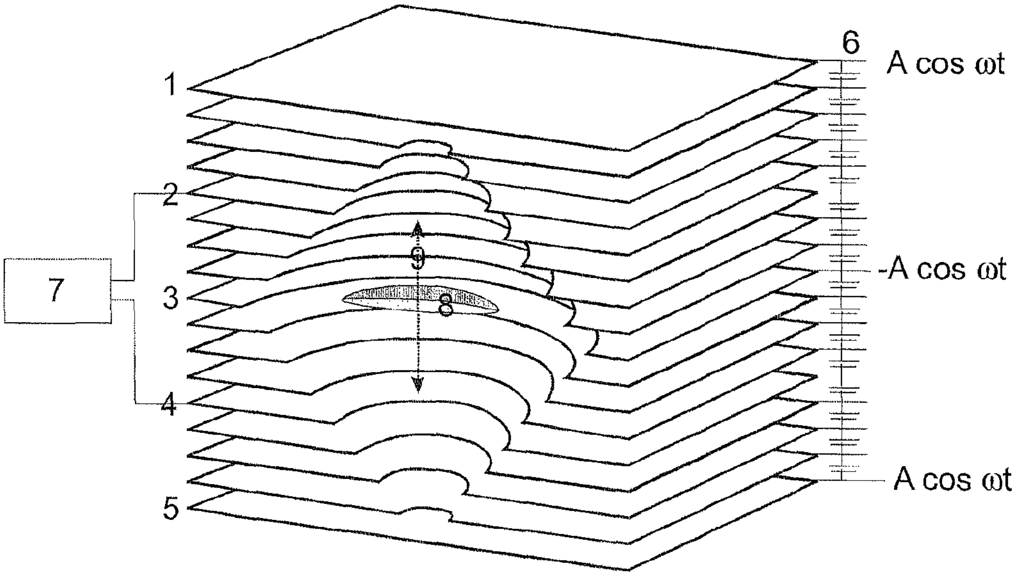

FIG. 2 shows the fundamental principle of an oscillation mass spectrometer which generates a 3D RF quadrupole field in the interior, as is found in the ion trap in FIG. 1. The advantage here is that two plates of the stack of plates serve as image current detector electrodes. The stack of plates may be produced in such a way that the capacitive coupling of these two plates, which are at zero potential, can be balanced in relation to the two plates above and below so that there is no capacitive induction from RF voltage. This requires the sizes of the plates in the stack, which have all been drawn the same size in FIG. 2, to be adjusted. Since the plates set potentials step-by-step, however, the field in the interior is not completely ideal. The field defects thus lead to harmonics whose signals can be eliminated with the aid of this invention.

Figure 3:
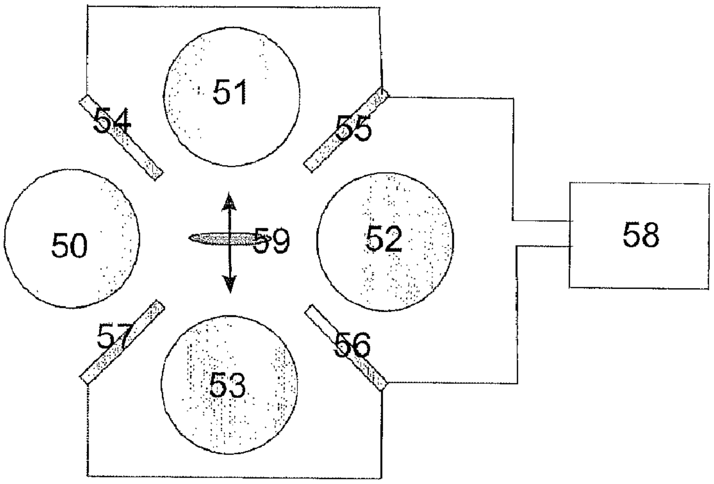

Another arrangement of an oscillation mass spectrometer is shown in FIG. 3. This is a so-called linear RF ion trap with four pole rods 50-53, where an elongated ion cloud 59 oscillates between two of the four pole rods. The image current detector electrodes 54-57, which are connected in pairs, are located precisely between the pole rods 50-53; no overall RF voltage is induced in them if the two phases of an RF voltage are applied alternately across the rods. This arrangement of the image current detectors gives this setup an advantage over the three-dimensional ion trap shown in FIG. 1.

The radial capture of the ion cloud can also be brought about by a strong magnetic field. The ion trap in FIG. 1 can therefore be operated with electrostatic voltages if they are confined in a strong magnetic field. A harmonic potential profile in which the ions can oscillate forms in the axis between the two end cap electrodes. But away from the axis, the potential profile is saddle-shaped, and this drives ions deviating from the axis outward. However, these deviating ions can also be forced to perform orbits by the strong magnetic field so that no losses occur. The whole of the end cap electrodes are then available to detect the image currents because no RF voltages radiate in.

Similarly, the ion trap in FIG. 2 can be confined in a magnetic field or, as shown in FIG. 3, the parabolic potential profile can be generated by an arrangement of ring diaphragms. This also creates a saddle-shaped potential.

The list of oscillation mass spectrometers is not complete; specialists can find further principles, especially principles that operate purely electrostatically. But there will always be principles which do not produce completely ideal fields, so techniques of the present invention can help to obtain true mass spectra free of false signals.

Although the present invention has been illustrated and described with respect to several preferred embodiments thereof, various changes, omissions and additions to the form and detail thereof, may be made therein, without departing from the spirit and scope of the invention.

What is claimed is:

1. A method of evaluating a frequency spectrum of a plurality of analyte ions obtained in an oscillation mass spectrometer, comprising:

investigating a plurality of frequency components within the frequency spectrum by identifying for each of the frequency components whether the frequency component is associated with a fundamental oscillation of the analyte ions or a harmonic of the fundamental oscillation; and attenuating the frequency components associated with the harmonics.

2. The method of claim 1, wherein in order to identify harmonics, analyses are carried out in the frequency spectrum to establish, for a plurality of oscillation signals, whether other oscillation signals examined have an integer fraction of the frequency of the oscillation signal under analysis.

3. The method of claim 1, wherein in order to identify harmonics, analyses are carried out in the frequency spectrum to establish, for a plurality of oscillation signals, whether other oscillation signals examined have an integer multiple of the frequency of the oscillation signal under analysis.

4. The method of claim 1, wherein an instrument-specific spectrum of the harmonics is measured for an oscillation mass spectrometer, and the signal height ratios of the spectrum of the harmonics are used to identify a signal as a harmonic.

5. The method of claim 1, wherein all signals of an isotope group are used to corroborate a signal as a harmonic.

6. The method of claim 5, wherein in order to identify a signal as a harmonic, the signal height ratios within the isotope group for the harmonics must agree with those of the fundamental oscillations.

7. A system for evaluating a frequency spectrum of a plurality of analyte ions obtained in an oscillation mass spectrometer, comprising:

means for investigating a plurality of frequency components within the frequency spectrum by identifying for each of the plurality of frequency components whether the frequency component is associated with a fundamental oscillation of the analyte ions or a harmonic of the fundamental oscillation; and means for attenuating the frequency components associated with the harmonics from the frequency spectrum.

8. A method of automatically evaluating a frequency spectrum obtained in an oscillation mass spectrometer, comprising:

reading ion currents within the oscillation mass spectrometer and providing an ion current signal indicative thereof;

transforming the ion current signal from the time domain to the frequency domain and providing frequency data indicative thereof;

analyzing the frequency data to determine harmonic frequency components within the frequency data;

processing the frequency data to attenuate the detected harmonic frequency components from the frequency data to provide corrected frequency data; and converting the corrected frequency data to a mass list.

9. The method of claim 8, where the steps of transforming comprises performing a Fourier analysis.

10. The method of claim 8, where the steps of transforming comprises performing a Fast Fourier Transform.

11. The method of claim 10, where the step of processing includes assigning a zero value to the amplitude value of a detected harmonic.

* * * * *

UNITED STATES PATENT AND TRADEMARK OFFICE

CERTIFICATE OF CORRECTION

PATENT NO. : 7,888,633 B2
APPLICATION NO. : 12/037506
DATED : February 15, 2011
INVENTOR(S) : Franzen et al.

It is certified that error appears in the above-identified patent and that said Letters Patent is hereby corrected as shown below:

Column 4
Line 51, delete “from” and insert --fro--

Column 10
Line 13, delete “steps” and insert --step--
Line 15, delete “steps” and insert --step--

Signed and Sealed this
Twenty-second Day of March, 2011

David J. Kappos
*Director of the United States Patent and Trademark Office*